Figure 1:
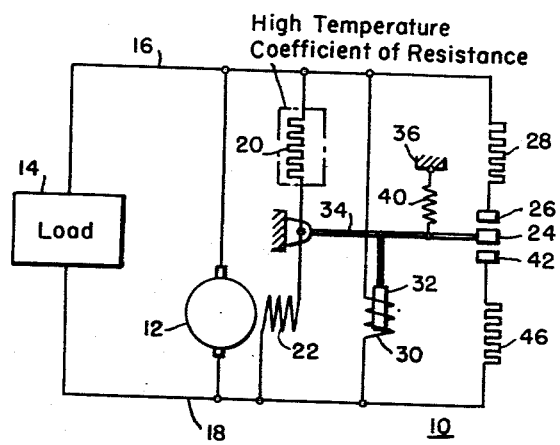

Sept. 21, 1954  W. A. KIRSCH ET AL  2,689,936
VOLTAGE REGULATOR
Filed Dec. 2, 1952

WITNESSES:

INVENTORS
William A. Kirsch
and Clifford M. Beistel.
BY
ATTORNEY

Patented Sept. 21, 1954

2,689,936

UNITED STATES PATENT OFFICE 2,689,936

VOLTAGE REGULATOR

William A. Kirsch, East McKeesport, and Clifford M. Beistel, Pitcairn, Pa., assignors to Westinghouse Electric Corporation, East Pittsburgh, Pa., a corporation of Pennsylvania Application December 2, 1952, Serial No. 323,665

8 Claims. (Cl. 322—28)

This invention relates to regulator systems and more particularly to such systems employing regulators of the vibrating type.

Regulators of the vibrating type present certain maintenance problems. For instance, the contact members of the vibrating regulator receive considerable wear owing to the fact that they are continuously interrupting electrical circuits. Further, the greater the current flow through the contact members and thus the greater the current that must be interrupted, the shorter is the life of the contact members. Therefore, in order to lengthen the life of the contact members of a vibrating type regulator, it is desirable to provide some means for limiting the current flow through the contact members while at the same time not decreasing the operating range of the regulator.

An object of this invention is to provide for greatly extending the life of the contact members of a vibratory generator voltage regulator without decreasing the operating range of the regulator, by so interconnecting a resistor having a high temperature coefficient of resistance with the contact members of the regulator and with the field winding of the generator that the resistor increases or decreases its resistance in accordance with the current flow through the field winding of the generator, to thereby lessen the flow of current through the contact members.

Another object of this invention is to so construct a vibratory generator voltage regulator that the regulator functions to maintain a substantially constant generator output voltage over a wider range of generator speed and load without decreasing the life of its contact members, by so interconnecting a resistor having a high temperature coefficient of resistance with the contact members of the regulator and with the field winding of the generator that the resistor increases or decreases its resistance in accordance with the current flow through the field winding of the generator, to thereby extend the range of current flow through the field winding.

Another object of this invention is to so construct a vibratory generator voltage regulator that the life of its contact members is extended and the regulator functions to maintain a substantially constant generator output voltage over a wider range of generator speed and load, by so interconnecting a resistor having a high temperature coefficient of resistance with the contact members of the regulator and with the field winding of the generator, that the resistor varies its resistance in accordance with the current flow through the field winding of the generator, to thereby lessen the flow of current through the contact members and extend the range of current flow through the field winding of the generator.

Figure 2:
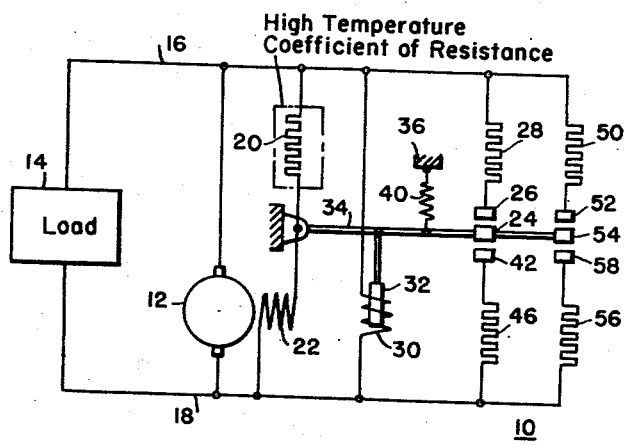

Other objects of this invention will become apparent from the following description when taken in conjunction with the accompanying drawing, in which:

Figure 1 is a schematic diagram of apparatus and circuits illustrating an embodiment of the teachings of this invention; and Fig. 2 is a schematic diagram of apparatus and circuits illustrating another embodiment of the teachings of this invention.

Referring to Fig. 1 there is illustrated a regulator 10 of the vibrating type for maintaining the output voltage of a direct-current generator 12 substantially constant. As illustrated, the generator 12 is disposed to supply energy to a variable load 14 through load conductors 16 and 18. Though not shown, the generator 12 is driven by some suitable motor means.

In particular, the regulator 10 comprises a resistor 20 having a high temperature coefficient of resistance. The resistor 20 derives its changing resistance characteristic from the use of a special alloy resistance wire. The alloy, like copper, exhibits an increase in resistivity with an increase in temperature, however, the increase for the alloy is much greater than for copper. When used in an electrical circuit, the resistance increases as the voltage across the resistor 20 increases. A rise in voltage across the resistor 20 results in an increase in power dissipated by the resistor 20, hence an increase in temperature, and thus an increase in the resistance of the resistor 20. The function of the resistor 20 will be described more fully hereinafter.

In this instance, a shunt field winding 22 of the generator 12 is connected in series circuit relationship with the resistor 20, the series circuit being connected across the output of the generator 12. Although the resistor 20 and field winding 22 are illustrated as being connected across the output of the generator 12, it is to be understood that this invention could be carried out by connecting the resistor 20 and field winding 22 to a suitable source of voltage.

In order to establish a circuit in parallel with the resistor 20 and thus increase the magnitude of the current flow through the field winding 22, a movable contact member 24 is disposed to be actuated into engagement with a stationary contact member 26. In particular, the movable contact member 24 is electrically connected to one end of the resistor 20 while the other end of the resistor 20 is connected through a resistor 28 to the stationary contact member 26. The function of the resistor 28 will be described hereinafter.

In order to actuate the movable contact member 24 out of engagement with the stationary contact member 26, an operating coil 30 responsive to the output voltage of the generator 12 is provided. As illustrated, a solenoid 32 is disposed in inductive relationship with the operating coil 30 and is mechanically connected to an electrical conducting arm 34 which in turn carries the movable contact member 24. As can be seen from the drawing, the movable contact member 24 is biased in an upward direction against the action of the operating coil 30 by means of a spring member 40 which is suitably connected to the arm 34 and to a stationary member 36.

The movable contact member 24 is also disposed to be actuated into engagement with a stationary contact member 42 to thereby establish a circuit in parallel with the field winding 22 of the generator 12 and thus decrease the magnitude of the current flow through the field winding 22. This circuit which is connected in parallel with the field winding 22 when the stationary contact member 42 and the movable contact 24 are in engagement, extends from one end of the field winding 22 through the arm 34, the movable contact member 24, the stationary contact member 42, and a resistor 46, the function of which will be described more fully hereinafter, to the other end of the field winding 22 of the generator 12.

In accordance with the teachings of this invention, the resistor 20, having a high temperature coefficient of resistance, is provided in order to decrease the magnitude of the current flow through the contact members 24 and 26 when these contact members are making and breaking contact and when relatively high current flows through the field winding 22, which in turn effects a decrease in the resistance of the resistor 20. This can be better understood by considering that when the current flow through the field winding 22 is relatively high, the voltage across the resistor 20 is relatively low.

Since the voltage across the resistor 20 is relatively low and thus the resistance of the resistor 20 is relatively low, a greater portion of the current flows through the resistor 20 than would be the case if an ordinary resistor having substantially no temperature coefficient of resistance were used in its place. By so decreasing the magnitude of the current flow through the contact members 24 and 26, the life of these contact members is increased.

When relatively low current flows through the field winding 22 with the contact members 24 and 42 making and breaking contact, the voltage across the resistance 20 is relatively high. Since the voltage across the resistor 20 under such conditions is relatively high, the temperature and thus the resistance of the resistor 20 is also relatively high. Therefore, the magnitude of the current flow through the resistor 20 and through the contact members 24 and 42 is less than would be the case if a resistor (not shown) having substantially no temperature coefficient of resistance had been provided. By decreasing the magnitude of the current flow through the movable contact member 24 and the stationary contact member 42 the life of these contact members is increased.

Not only is the magnitude of the current flow through the movable contact member 24 and the opposed stationary contact members 26 and 42 decreased by the insertion of the resistor 20, having a high temperature coefficient of resistance, but by the provision of such a resistor 20, the operating range of the regulator 10 is extended. The reason the operating range is extended is that when the contact members 24 and 26 are in engagement and the resistor 20 is provided the resistance of the parallel circuit comprising the resistor 20 and the resistor 28 is decreased to thereby increase the magnitude of the current flow through the field winding 22 of the generator 12. On the other hand, when the contact members 24 and 42 are in engagement and the resistor 20 is provided, the magnitude of the current flow to the parallel circuit comprising the field winding 22 and the resistor 46 is decreased to thereby decrease the current flow through the field winding 22.

If it is desired to extend further the contact life of the contact members 24 and 26 sacrificing the extension of the operating range of the regulator 10 by the resistor 20, the resistance of the resistor 28 can be increased. By increasing the resistance of the resistor 28, it has been found in practice that the life of the contact members 24 and 26 is extended. In practice it has also been found that the life of the contact members 24 and 42 is extended by increasing the resistance of the resistor 46. However, in order to obtain this further extension in the life of the contact members 24 and 42, the extended operating range obtained by the resistor 20 has to be sacrificed.

However, when using the resistor 20, if it is desired to further extend the operating range of the regulator 10 by sacrificing the extension in contact life of the contact members 24, 26, and 42 gained by utilizing the resistor 20, the resistance of either or both of the resistors 28 and 46 can be decreased. By decreasing the resistance of the resistor 28, the magnitude of the current flow through the field winding 22 of the generator 12 is increased when the contact members 24 and 26 are in engagement. On the other hand by decreasing the resistance of the resistor 46, more current is shunted through the resistor 46 when the contact members 24 and 42 are in engagement, thus decreasing the current flow through the field winding 22.

The operation of the regulator 10 will now be described. It will be apparent that in order to maintain the output voltage of the generator 12 substantially constant while changes in the speed of the generator 12 or in the magnitude of the load connected thereto, or both, are taking place, means must be provided to vary the magnitude of the current flowing through the field winding 22 to any value within a predetermined range.

Assuming that the voltage between the load conductors 16 and 18, which are connected to the regulator 10, is the voltage which the regulator 10 is constructed to maintain, it will be seen that the maximum current which may be made to flow through the field winding 22 is obtained when the movable contact member 24 is solidly in contact with the stationary contact member 26. The resistance values of the resistors 20 and 28 are chosen with due consideration to the resistance of the field winding 22, that this maximum current will be sufficient to maintain the output voltage of the generator 12 at the regulated value when the generator 12 is operating at the speed and load at which the field current demand is greatest.

Again assuming that the voltage between the load conductors 16 and 18 is the voltage which the regulator 10 is constructed to maintain, it will be seen that the minimum current which may be made to flow through the field winding 22 is obtained when the movable contact member 24 is solidly in contact with the stationary contact member 42. The resistance value of the resistor 46 is so chosen with due consideration to the resistance of the field winding 22 and the resistor 20 that this minimum current is sufficiently low so that the output voltage of the generator 12 does not exceed the regulated value when the generator 12 is operating at the speed and load at which the field current demand is least. Thus, the function of the regulator 10 is to adjust the current flow through the field winding 22 of the generator 12 to any required value between the minimum and maximum values hereinbefore described.

Assuming that the current demanded by the field winding 22 is some value lower than the above-mentioned maximum value and the movable contact member 24 is making contact with the stationary contact member 26, the current flow through the field winding 22 is of such a value that the output voltage of the generator 12 is sufficiently high to effect a disengagement of the contact members 24 and 26. This disengagement is effected by the operating coil 30, to thus decrease the current flow through the field winding 22. As a result, the output voltage of the generator 12 is decreased, thereby decreasing the magnetic pull of the operating coil 30 so that the movable contact member 24 again makes contact with the stationary contact member 26. This results in an increase in the current flow through the field winding 22 and an increase in the output voltage of the generator 12, whereupon the operating coil 30 again effects an actuation of the movable contact member 24 out of contact with the stationary contact member 26, to thus repeat the cycle. The complete cycle consisting of the movable contact member 24 breaking and making contact with the stationary contact member 26 usually occurs in a fraction of a second so that even though the output voltage of the generator 12 alternately increases and decreases with the making and breaking of the contact members 24 and 26, the output voltage of the generator 12 is substantially steady, stable and remains within a few per cent of the voltage which the regulation 10 is set to maintain.

It is apparent that as the speed of, and the load on, the generator 12 change, the current demanded by the field winding 22 assumes different values. The regulator 10 reacts to a change in the magnitude of the current demanded by the field winding 22, by changing the ratio of the length of time the contact members 24 and 26 are in contact with each other to the total time required for the complete cycle of breaking and making these contact members 24 and 26.

Assuming the voltage across the load conductors 16 and 18 is at the regulated value and the movable contact member 24 moves to a position between the opposed stationary contact members 26 and 42 so that the movable contact member 24 does not make contact with either of these stationary contact members, no current flows in either of the resistors 28 or 46, and the current that flows in the field winding 22 of the generator 12 is determined by the sum of the resistances of the field winding 22 and resistor 20. This value of current through the field winding 22 maintains the output voltage of the generator 12 at the regulated value for certain conditions of speed of the generator and load thereon. If the speed and load of the generator 12 change so that the current demanded by the field winding 22 is less than that obtained when no current flows through either of the resistors 28 or 46, the output voltage of the generator 12 increases whereupon the operating coil 30 effects an actuation of the movable contact member 24 into contact with the stationary contact member 42. This establishes a current path in shunt with the field winding 22, thereby decreasing the current flow through the field winding 22. Such an action results in a decrease in the output voltage of the generator 12, whereupon the pull effected by the operating coil 30 is decreased, and the spring member 40 pulls the movable contact member 24 out of contact with the stationary contact member 42. This results in an increase in the output voltage of the generator 12, whereupon the pull effected by the operating coil 30 is increased so that the movable contact member 24 is brought back into contact with the stationary contact member 42. This cycle consisting of the movable contact member 24 alternately making and breaking contact with the stationary contact member 42 usually occurs in a fraction of a second so that even though the output voltage of the generator 12 alternately increases and decreases with the breaking and making of the contact members 24 and 42 of the regulator 10, the output voltage of the generator 12 is substantially steady, stable and remains within a few per cent of the voltage which the regulator 10 is set to maintain.

Referring to Fig. 2 of the drawings, there is illustrated another embodiment of the teachings of this invention in which the same reference characters have been given to like components of Fig. 1. The main distinction between the apparatus illustrated in Figs. 1 and 2 is that in the apparatus of Fig. 2 the current carrying capacity of the contact members is increased by providing additional circuits that can be connected in shunt with the resistor 20 and with the field winding 22, respectively. By providing these additional shunt circuits, the regulator 10 can maintain a substantially constant generator output voltage over a wider range of speed and load of generator 12, and yet the amount of current flow through the contact members is not increased. The additional circuit that can be connected in shunt with the resistor 20 comprises a resistor 50, one end of which is connected to the resistor 28, a stationary contact member 52 which is connected to the other end of the resistor 50, and a movable contact member 54 which is electrically connected to the movable contact member 24 and is disposed to be actuated into engagement with the stationary contact member 52.

On the other hand, the additional circuit that can be connected in shunt to the field winding 22 of the generator 12 comprises a resistor 56, one end of which is connected to the resistor 46, a stationary contact member 58 which is connected to the other end of the resistor 56, and the movable contact member 54 which is electrically connected to the movable contact member 24 and is disposed to be actuated into engagement with the stationary contact member 58.

In practice, the movable contact members 24 and 54 simultaneously engage the stationary contact members 26 and 52, respectively, upon actuation in one direction, and simultaneously engage the stationary contact members 42 and 58, respectively, upon actuation in the other direction. Since the remaining operation of the apparatus of Fig. 2 is substantially the same as the operation of the apparatus illustrated in Fig. 1, in order to simplify the description, such operation is not described.

It is to be understood that in the apparatus of Fig. 1, the resistor 28 can be eliminated and a direct connection between the load conductor 16 and the stationary contact member 26 substituted therefor. Also a direct connection between the line conductor 18 and the stationary contact member 42 can be substituted for the resistor 46. The elimination of either or both of the resistors 28 and 46 and the substitution of a direct connection, or direct connections therefor, increases the operating range of the regulator 10. It is also to be understood that when only one of the stationary contact members 26 or 42 is used in conjunction with the movable contact member 24, the remaining resistor 28 or 46 can also be eliminated, and a direct connection substituted therefor.

It is further to be understood that although a direct-current generator 12 has been illustrated in the apparatus of Figs. 1 and 2, the regulator associated therewith is capable of regulating the output voltage of an alternating-current generator (not shown) provided certain changes are made. For instance, before applying the output voltage of the alternating-current generator (not shown) to the operating coil 30, it should be suitably rectified. The other components need not be changed.

Since certain changes may be made in the above apparatus and circuits, and different embodiments of this invention may be made without departing from the spirit and scope thereof, it is intended that all the matter contained in the above description or shown in the accompanying drawing shall be interpreted as illustrative and not in a limiting sense.

We claim as our invention:

1. In a vibratory regulator for maintaining the output voltage of a generator having a field winding substantially constant, the combination comprising, a resistor having a high temperature coefficient of resistance, a movable contact member and a stationary contact member, means for so connecting the field winding to said contact members that when said contact members are in engagement a parallel circuit is established, one branch comprising the field winding and the other branch comprising an electrical circuit including said contact members, circuit means for connecting said resistor to the field winding and for connecting said resistor and the filed winding to a source of voltage, an operating coil responsive to the output voltage of the generator for effecting an actuation of the movable contact member with respect to the stationary contact member so that when relatively low current flows through the field winding the resistance of said resistor is relatively high to thus lessen the current flow through said contact members, and means for biasing the movable contact member against the action of the operating coil.

2. In a vibratory regulator for maintaining the output voltage of a generator having a field winding substantially constant, the combination comprising, a resistor having a high temperature coefficient of resistance, a movable contact member and a stationary contact member, means for so connecting said resistor to the stationary and movable contact members that when said contact members are in engagement, a parallel circuit is established, one branch comprising said resistor and the other branch comprising an electrical circuit including said contact members and another resistor, circuit means for connecting the field winding to said resistor having a high temperature coefficient of resistance and for connecting the field winding and said resistor having a high temperature coefficient of resistance to a source of voltage, an operating coil responsive to the output voltage of the generator for effecting an actuation of the movable contact member with respect to the stationary contact member so that when relatively high current flows through the field winding the resistance of said resistor having a high temperature coefficient of resistance is relatively low, to thus lessen the current flow through said contact members, and means for biasing the movable contact member against the action of the operating coil.

3. In a vibratory regulator for maintaining the output voltage of a generator having a field-winding substantially constant, the combination comprising, a resistor having a high temperature coefficient of resistance, a movable contact member and a stationary contact member, means for so connecting the field winding to said contact members that when said contact members are in engagement a parallel circuit is established, one branch comprising the field winding and the other branch comprising an electrical circuit including said contact members and another resistor, circuit means for connecting said resistor having a high temperature coefficient of resistance to the field winding and for connecting said resistor having a high temperature coefficient of resistance and the field winding to a source of voltage, an operating coil responsive to the output voltage of the generator for effecting an actuation of the movable contact member with respect to the stationary contact member so that when relatively low current flows through the field winding the resistance of said resistor having a high temperature coefficient of resistance is relatively high, to thus lessen the current flow through said contact members, and means for biasing the movable contact member against the action of the operating coil.

4. In a vibratory regulator for maintaining the output voltage of a generator having a field winding substantially constant, the combination comprising, a resistor having a high temperature coefficient of resistance, a movable contact member and two opposed stationary contact members, means for so connecting said resistor to the movable contact member and to one of the two opposed stationary contact members that when said movable contact member and said one of the two opposed stationary contact members are in engagement a parallel circuit is established, one branch comprising said resistor and the other branch comprising an electrical circuit including the movable contact member and said one of the two opposed stationary contact members, circuit means for connecting the field winding to said resistor and for connecting the field winding and said resistor to a source of voltage, means for so connecting the field winding to the movable contact member and to the other of the two opposed stationary contact members that when the movable contact member and said other of the two opposed stationary contact members are in engagement, another parallel circuit is established, one branch comprising the field winding and the other branch comprising an electrical circuit including the movable contact member and said other of the two opposed stationary contact members, an operating coil responsive to the output voltage of the generator for effecting an actuation of the movable contact member with respect to the two opposed stationary contact members so that when relatively high current flows through the field winding the resistance of said resistor is relatively low, to thus lessen the current flow through the movable contact member and said one of the two opposed stationary contact members, and so that when relatively low current flows through the field winding the resistance of said resistor is relatively high, to thus lessen the current flow through the movable contact member and said other of the two opposed stationary contact members, and means for biasing the movable contact member against the action of the operating coil.

5. In a vibratory regulator for maintaining the output voltage of a generator having a field winding substantially constant, the combination comprising, a resistor having a high temperature coefficient of resistance, a movable contact member and two opposed stationary contact members, means for so connecting said resistor to the movable contact member and to one of the two opposed stationary contact members that when said movable contact member and said one of the two opposed stationary contact members are in engagement, a parallel circuit is established, one branch comprising said resistor and the other branch comprising an electrical circuit including the movable contact member, said one of the two opposed stationary contact members, and another resistor, circuit means for connecting the field winding to said resistor having a high temperature coefficient of resistance and for connecting the field winding and said resistor having a high temperature coefficient of resistance to a source of voltage, means for so connecting the field winding to the movable contact member and to the other of the two opposed stationary contact members that when the movable contact member and said other of the two opposed stationary contact members are in engagement, another parallel circuit is established, one branch comprising the field winding and the other branch comprising an electrical circuit including the movable contact member, said other of the two opposed stationary contact members, and still another resistor, an operating coil responsive to the output voltage of the generator for effecting an actuation of the movable contact member with respect to the two opposed stationary contact members so that when relatively high current flows through the field winding the resistance of said resistor having a high temperature coefficient of resistance is relatively low, to thus lessen the current flow through the movable contact member and said one of the two opposed stationary contact members, and so that when relatively low current flows through the field winding the resistance of said resistor having a high coefficient of resistance is relatively high, to thus lessen the current flow through the movable contact member and said other of the two opposed stationary contact members, and means for biasing the movable contact member against the action of the operating coil.

6. In a vibratory regulator for maintaining the output voltage of a generator having a field winding substantially constant, the combination comprising, a resistor having a high temperature coefficient of resistance, a pair of stationary contact members and movable contact means disposed for closing two circuits in shunt relation to said resistor, each shunt circuit comprising one of the stationary contact members, another resistor, and the movable contact means, circuit means for connecting the field winding to said resistor and for connecting the field winding and said resistor to a source of voltage, an operating coil responsive to the output voltage of the generator for effecting an actuation of the movable contact means with respect to the pair of stationary contact members so that when relatively high current flows through the field winding the resistance of said resistor is relatively low, to thus lessen the flow of current through the movable contact means and the pair of stationary contact members, and means for biasing the movable contact means against the action of the operating coil.

7. In a vibratory regulator for maintaining the output voltage of a generator having a field winding substantially constant, the combination comprising, a resistor having a high temperature coefficient of resistance, a pair of stationary contact members and movable contact means disposed for closing two circuits in shunt relation to the field winding, each shunt circuit comprising one of the stationary contact members, another resistor, and the movable contact means, circuit means for connecting the field winding to said resistor and for connecting the field winding and said resistor to a source of voltage, an operating coil responsive to the output voltage of the generator for effecting an actuation of the movable contact means with respect to the pair of stationary contact members so that when relatively low current flows through the field winding the resistance of said resistor is relatively high, to thus lessen the flow of current through the movable contact means and the pair of stationary contact members, and means for biasing the movable contact means against the action of the operating coil.

8. In a vibratory regulator for maintaining the output voltage of a generator having a field winding substantially constant, the combination comprising, a resistor having a high temperature coefficient of resistance, a pair of stationary contact members and movable contact means disposed for closing two circuits in shunt relation to said resistor, each shunt circuit comprising the movable contact means, one of the stationary contact members, and a resistance member, another pair of stationary contact members, the movable contact means also being disposed for closing two circuits in shunt relation to the field winding, each shunt circuit comprising the movable contact means, one of the stationary contact members of said other pair of stationary contact members, and another resistance member, circuit means for connecting the field winding to said resistor having a high temperature coefficient of resistance and for connecting the field winding and said resistor having a high temperature coefficient of resistance to a source of voltage, an operating coil responsive to the output voltage of the generator for effecting an actuation of the movable contact means with respect to said pair of stationary contact members and with respect to said other pair of stationary contact members, so that when relatively high current flows through the field winding the resistance of said resistor having a high temperature coefficient of resistance is relatively low, to thus lessen the current flow through the movable contact means and said pair of stationary contact members, and so that when relatively low current flows through the field winding the resistance of said resistor having a high temperature coefficient of resistance is relatively high, to thus lessen the current flow through the movable contact means and said another pair of stationary contact members, and means for biasing the movable contact means against the action of the operating coil.

References Cited in the file of this patent

UNITED STATES PATENTS

| Number | Name | Date |
|---|---|---|
| 1,091,420 | Apple | Mar. 24, 1914 |
| 2,295,305 | Summers | Sept. 8, 1942 |